(12) United States Patent
Corona

(10) Patent No.: US 6,181,350 B1
(45) Date of Patent: *Jan. 30, 2001

(54) APPARATUS FOR, AND METHOD OF, INTERPOLATING BETWEEN GRAPHICS AND VIDEO PIXELS IN AN EXPANDED IMAGE

(75) Inventor: James Corona, San Diego, CA (US)

(73) Assignee: Conexant Systems, Inc., Newport Beach, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/650,820

(22) Filed: May 20, 1996

(51) Int. Cl.$^7$ .................................................. G06T 3/40
(52) U.S. Cl. ........................................ 345/439; 345/428
(58) Field of Search ............................ 345/428, 433, 345/439, 127, 132, 138, 150, 154; 348/426, 441, 458, 552, 561, 563, 564; 382/162, 166, 298, 299; 358/451

(56) References Cited

U.S. PATENT DOCUMENTS

| | | | |
|---|---|---|---|
| 5,258,826 | * 11/1993 | Wakeland et al. | 348/488 |
| 5,283,561 | * 2/1994 | Lumelsky et al. | 345/340 |
| 5,341,442 | * 8/1994 | Barrett | 382/166 |
| 5,406,306 | * 4/1995 | Siann et al. | 345/115 |
| 5,469,222 | * 11/1995 | Sprague | 348/580 |
| 5,574,572 | * 11/1996 | Malinowski et al. | 358/451 |
| 5,684,544 | * 11/1997 | Astle | 348/708 |
| 5,691,746 | * 11/1997 | Shyu | 345/150 |
| 5,694,149 | * 12/1997 | Cahill, III | 345/127 |

* cited by examiner

*Primary Examiner*—Stephen S. Hong
(74) *Attorney, Agent, or Firm*—Foley & Lardner

(57) ABSTRACT

An image has a portion formulated partially from graphics pixels and partially from video pixels. This image portion is interpolated to provide an enlargement of such image portion. The interpolation or enlargement may be provided sequentially in two (2) coordinate directions (e.g. horizontal and vertical) or alternatively in only one of such directions. The enlargement may be alternatively provided simultaneously in both coordinate directions. The enlargement of the image portion in each of the coordinate directions may be obtained by interpolating video pixel(s) in such coordinate direction between each pair of adjacent video pixels in such coordinate direction and by otherwise interpolating graphics pixel(s) between such pair of adjacent pixels in such coordinate direction. In other words, graphics pixel(s) may be provided between each pair of adjacent pixels in each of the coordinate directions when one or both of the adjacent pixels in such pair are graphics. The enlargement may be to any extent desired in the coordinate directions. The video pixels may be in a YUV or YCrCb format where Y represents the hue or intensity of the image and Cr and Cb (or U and V) represent the two (2) quadrature components of the chrominance or color. For each interpolated video pixel, an interpolation may be provided between the values in the adjacent pixels on the opposite sides of such interpolated pixel.

14 Claims, 4 Drawing Sheets

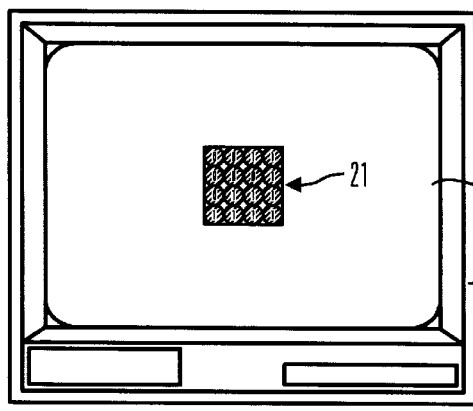
FIG. 2
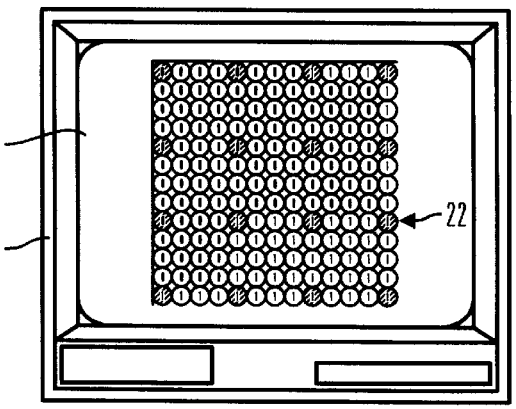
FIG. 3
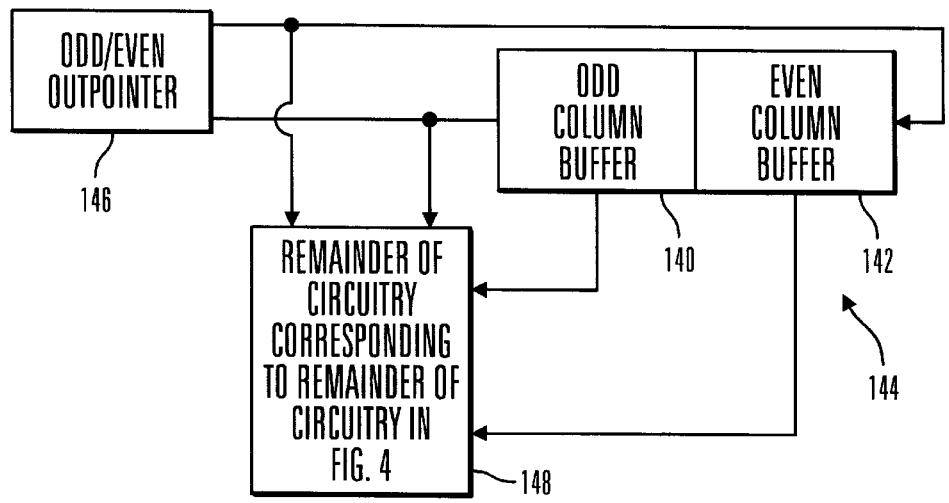
FIG. 5
| SOURCE VIDEO CHROMA KEY | | | | RESULTANT CHROMA KEY |
|---|---|---|---|---|
| (X,Y) | (X,Y+1) | (X+1,Y) | (X+1,Y+1) | (X',Y') |
| 0 | — | — | — | 0 |
| — | 0 | — | — | 0 |
| — | — | 0 | — | 0 |
| — | — | — | 0 | 0 |
| 1 | 1 | 1 | 1 | 1 |
FIG. 6

APPARATUS FOR, AND METHOD OF, INTERPOLATING BETWEEN GRAPHICS AND VIDEO PIXELS IN AN EXPANDED IMAGE

This invention relates to a system for, and a method of, interpolating a portion of an image (where the portion of the image contains a mixture of graphics pixels and video pixels) and for providing an expanded image including additional pixels interpolated from the pairs of adjacent pixels in the image portion in each of two coordinate (e.g. horizontal and vertical) directions or in only one of such directions.

BACKGROUND OF THE INVENTION

Personal computers include a display monitor for displaying visual images produced as a result of processing of data in the personal computers. Until recent years, the display monitors provided an image of only graphics on the faces of the display monitors. Graphics may be defined as documents, or charts, in which the images displayed on the faces of the display monitors are static or stationary.

In recent years, graphics and video have been simultaneously displayed on the faces of the display monitors in personal computers. Video may be defined as images in which there is a dynamic motion of an animate or inanimate object. The video has been typically stored on a tape or in a VCR. Generally the video has been displayed in a window on the face of the display monitor and the graphics has been displayed on the face of the display monitor other than the window.

The graphics has been stored in a binary form representing each of the primary colors red, green and blue for a pixel. When the graphics representation has been in true colors, each pixel has been illustratively formed from first, second and third pluralities of binary bits respectively representing the primary colors red, green and blue, the number of binary bits in each of the first, second and third pluralities generally being the same. For example, each of the three (3) primary colors has been represented by eight binary bits.

Alternatively, the graphics representation for each pixel has been in pseudo color. In pseudo color, graphics pixel has been represented by a plurality (generally 8) of binary bits which have indicated a particular one of a plurality of different positions in a lookup table. At each position, pluralities of bits, arbitrarily selected, have represented the primary colors red, green and blue. For example, when the graphics pixel is represented by eight (8) binary bits, the lookup table has 256 different positions, each selected by an individual pattern of binary 1's and binary 0's in the eight (8) binary bits. The color selected from the lookup table is designated as pseudo color because the arbitrarily selected colors at the 256 positions in the lookup table are only a small number of the millions of possible colors which are available in the real world.

In the prior art, each video pixel has generally been in a YUV or YCrCb format. In these formats, Y indicates the hue or intensity of the image dot provided by the pixel on the face of the display monitor and Cr and Cb (or U and V) represent the quadrature components of the color or chrominance in the pixel. Pixels in the YUV or YCrCb format are often compressed; as on a tape or in a VCR before they are recorded. To display the video image in a window on the face of a display monitor in a personal computer, the video pixels are decompressed and are then converted from the YCrCb format (or the YUV format) to the RGB format corresponding to the format for the graphics pixels.

Sometimes the video pixels are interpolated (or enlarged) after they have been decompressed. The enlargement of the image is generally obtained by averaging the values of each successive pair of adjacent decompressed pixels in a coordinate direction and inserting this average value between the adjacent pixels in such successive pair. The enlargement has been often, but not always, been primarily provided in a single coordinate direction.

U.S. Pat. No. 5,406,306 issued to Jonathan I. Siann, Conrad M. Coffey and Jeffrey L. Easley on Apr. 11, 1995, and assigned of record to the assignee of record of this application discloses and claims a "System For, and Method of, Displaying Information From a Graphics Memory and a video Memory on a Display Monitor." In the system of the '306 patent, graphics in the RGB format and video in a compressed YUV or YCrCb format are stored in a single display memory. The compressed video is read from the display memory in the compressed YUV (or YCrCb) format, decompressed and converted to the RGB format.

In the system disclosed and claimed in U.S. Pat. No. 5,406,306, the decompressed video image in the RGB format may then be enlarged. The graphics image may then be displayed on all of the face of a display monitor except for a window and the enlarged video image may be displayed in the window on the face of the display monitor. However, only the video image is enlarged in U.S. Pat. No. 5,406,306 and only the enlarged video image is displayed in the window on the face of the display monitor in the patent.

BRIEF DESCRIPTION OF THE INVENTION

This invention discloses a system for, and method of, interpolating or enlarging a portion of an image where the portion of the image is composed partially of graphics pixels and partially of video pixels. In the system and method of this invention, priority in the interpolation or enlargement is given to a particular one of the graphics and video, preferably to the graphics. As a result, in any instance where there is a doubt as to whether a particular pixel position in the enlarged image portion should have a graphics image or a video image, the graphics image is displayed.

In one embodiment of the invention, an image has a portion formulated partially from graphics pixels and partially from video pixels. This image portion is interpolated to provide an enlargement of such image portion. The interpolation or enlargement may be sequentially provided in two (2) coordinate directions (e.g. horizontal and vertical) or alternatively in only one of such directions. The enlargement may be alternatively provided simultaneously in the coordinate directions.

The enlargement of the image portion in each of the coordinate directions may be obtained by interpolating video pixel(s) in such coordinate direction between each pair of adjacent video pixels in such coordinate direction and by otherwise interpolating graphics pixel(s) between such pair of adjacent pixels in such coordinate direction. In other words, a graphics pixel(s) may be provided between each pair of adjacent pixels in each of the coordinate directions when one or both of the adjacent pixels in such pair are graphics.

The enlargement may be to any extent desired in the coordinate directions. The video pixels may be in a YUV or YCrCb format where Y represents the hue or intensity of the image and Cr and Cb (or U and V) represent the two (2) quadrature components of the chrominance or color. For each interpolated video pixel, an interpolation may be provided between the values in the adjacent pixels on the opposite sides of such interpolated pixel.

BRIEF DESCRIPTION OF THE DRAWINGS

In the drawings:

FIG. 2 schematically shows the face of a display monitor and also shows a window on the face of the display monitor for displaying the image portion shown in FIG. 1 before the enlargement of the image portion;

FIG. 3 is a view similar to that shown in FIG. 2 but shows the enlarged image portion in an enlarged window on the face of the video monitor;

FIG. 5 is a circuit diagram, partially in block form, showing a system for enlarging in a horizontal direction the image portion schematically shown in FIG. 1 after the image portion has been enlarged in the vertical direciton by the system shown in FIG. 4;

FIG. 6 is a table showing how the enlargement of the image is controlled in accordance with the relative dispositions of graphics pixels and video pixels in the portion to be enlarged.

DETAILED DESCRIPTION OF THE INVENTION

Figure 1:
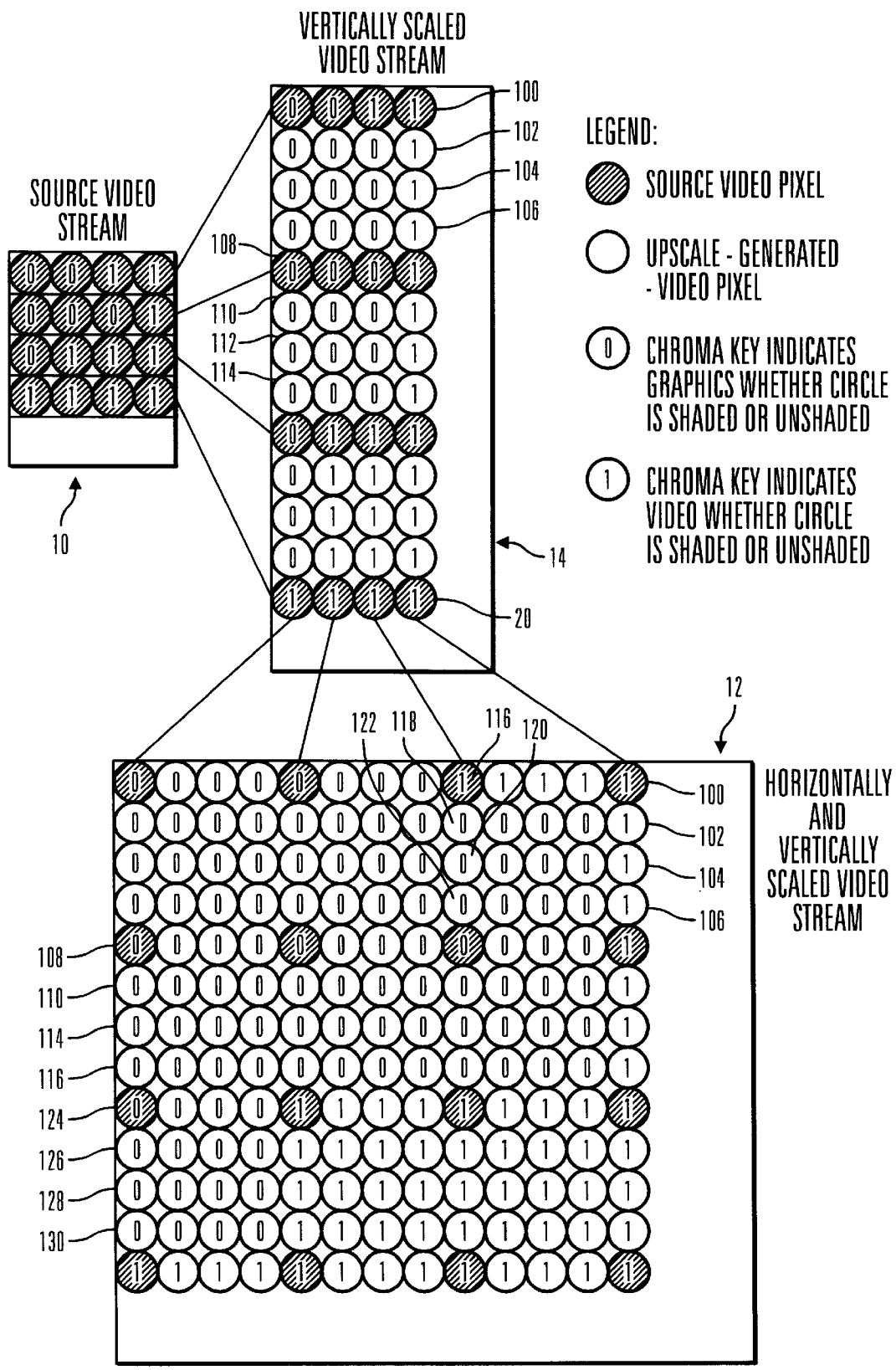
FIG. 1 schematically shows an image portion to be interpolated or enlarged, the enlargement of the image portion being provided initially in a vertical direction and then an enlargement being provided in a horizontal direction of the image portion previously enlarged in the vertical direction.

FIG. 1 schematically shows one embodiment of the invention for interpolating or enlarging a portion of an image where the image portion contains graphics pixels and video pixels. In the embodiment shown in FIG. 1, the image portion to be interpolated or enlarged is generally indicated at 10. The image portion 10 is comprised of a plurality of pixels disposed in two (2) coordinate directions (e.g. vertical and horizontal). A square of sixteen (16) pixels is shown at 10 in FIG. 1. It will be appreciated that this square of sixteen (16) pixels is only illustrative and that the image may be formed by any specified number of pixels.

Each pixel in the image portion 10 is provided with a black background to indicate that it is one of the pixels in the image portion. A circle with a white background is provided at the center of each of the pixels in the image portion 10. A numeral "1" or a numeral "0" is provided in each of these circles. The numeral "1" in a white circle indicates that the pixel is a video pixel. The numeral "0" in a white circle indicates that the pixel is a graphics pixel.

As generally indicated at 12 in FIG. 1, the image portion 10 constituting a square of sixteen (16) pixels is to be expanded into a square of one hundred and sixty nine (169) pixels. FIG. 1 indicates that the expansion is initially provided in the vertical direction and then the expansion initially provided in the vertical direction is provided in the horizontal direction. It will be appreciated that the expansion may be initially provided in the horizontal direction and then in the vertical direction without departing from the scope of the invention. It will also be appreciated that the expansion may be provided simultaneously in the horizontal and vertical directions without departing from the scope of the invention.

As shown schematically at 14 in FIG. 1, the enlargement of the image portion 10 may initially be provided vertically. For example, the first two (2) pixels (reading from the left to the right) in the top row of the image portion 10 constitute graphics and the other two (2) pixels in the top row may constitute video. In the row second from the top, the first three (3) pixels (reading from the left to the right) may constitute graphics and the last pixel in the row may constitute video.

When the pixels in the pixel portion 10 are vertically expanded, video is provided in each of the expanded pixel positions in a column when the two (2) pixels involved in such expansion in such column are both video. This may be seen from the expansion of the video pixels in the first two (2) rows of the last column in the image portion 10. Otherwise, a graphics pixel is provided in each of the expanded pixel positions in a column. In other words, when both of the pixel positions in a column in the image portion 10 are graphics, a graphics pixel is provided in each of the expanded pixel positions in such column. This may be seen from the first two (2) rows of the first column in the image portion 10. Similarly, when one of the pixels in a column is graphics and the other pixel in the column is video, the expanded pixel positions in the column are graphics. This may be seen from the expansion of the first two (2) rows of the third column in the image portion 10.

The expanded pixels in the vertical direction are generally indicated at 14 in FIG. 1. They include the video pixels in the image portion and additional or interpolated pixels. As shown at 20 in FIG. 1, the pixels common to the image portion 10 and the image portion 14 are shown with a dark background corresponding to the dark background of these pixels in the image portion 10. These pixels are provided with a binary "1" or a binary "0" within a white circle corresponding to the pixels in the image portion 10. The expanded or interpolated pixels in the vertically expanded image portion 14 are provided with a white background. These vertically expanded pixels are provided with a printed "1" within the white background to indicate video pixels and with a printed "0" in the white background to indicate graphics pixels.

The vertically expanded image portion 14 is expanded horizontally to provide the expanded image portion 12. The rules for expanding the image portion 14 horizontally are the same as those described above for expanding the image portion 10 vertically. In the expanded image portion 12, the pixels common to corresponding pixels in the image portion 10 are shown with a dark background and the expanded or interpolated pixels are shown with a white background. Each pixel is provided with a printed "1" with the white or dark background to indicate a video pixel or with a printed "0" within the white or dark background to indicate a graphics pixel.

FIG. 2 indicates a face 16 of a display monitor 18. The image portion 10 is indicated as being disposed within a window 21 on the face 16 of the display monitor 18. FIG. 3 indicates the face 16 on the display monitor 18. FIG. 3 indicates an expanded window 22 for displaying the expanded image portion 12 of FIG. 1. As will be seen from the pixels with a printed "1" in the expanded image portion 12 in FIG. 1, the expanded image 12 has an irregular shape in which the video pixels are displayed. This may be the first time that an expanded image with an irregular shape for video pixels has been provided.

Figure 4:
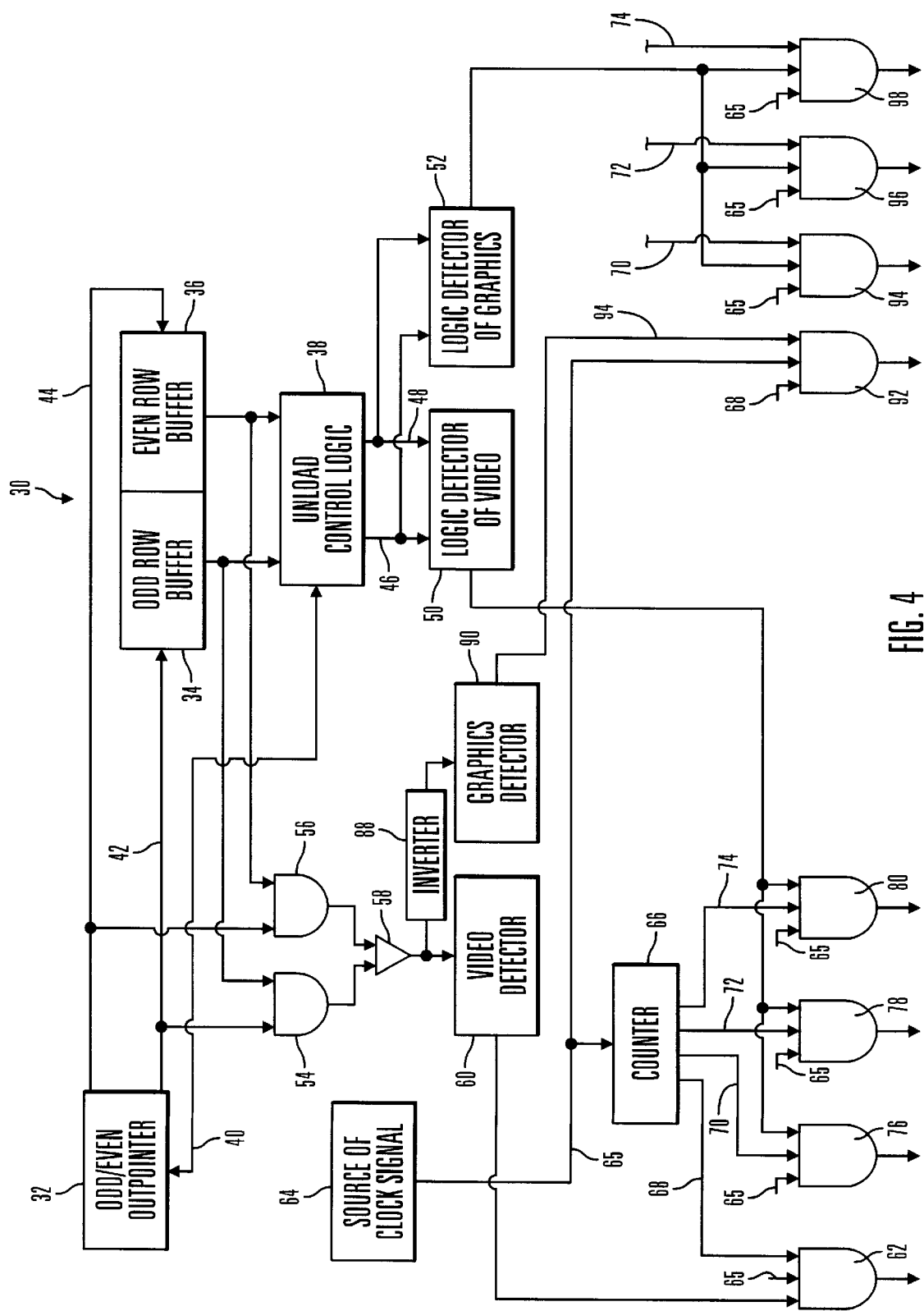
FIG. 4 is a circuit diagram, partially in block form, showing a system for enlarging in a vertical direction the image portion schematically shown in FIG. 1.

FIG. 4 is a block diagram of a system, generally indicated at 30, which can be used to provide the enlargement of the image portion 10 to the image portion 14 as shown in FIG. 1. Although the following discussion pertains specifically to the use of the system 30 to enlarge the image portion 10 vertically to obtain the image portion 14, a system substantially identical to the system 30 can be used to enlarge the image portion 14 horizontally to obtain the image portion 12. This is shown schematically in FIG. 5.

The circuit diagram of FIG. 4 includes an even/odd outpointer 32. The even/odd outpointer 32 indicates whether the top one of the two (2) rows being processed on a column-by-column basis at any instant is an odd row or an even row. The pixels in each odd row are stored in an odd row buffer 34 and the pixels in each even row are stored in an even row buffer 36. The processing of the successive pixels in the two (2) rows on a column-by-column basis is controlled by unload control logic 38. The unload control logic 38 controls the processing of the pixels in the two (2) rows on a column-by-column basis and advances the pixels progressively through the two (2) rows from each individual one of the columns to the next individual one of the columns when the processing of the pixels in such individual one of the columns has been completed.

The operation of the odd/evenpointer 32 may be seen from the following example. Assume that the pixels in the first two (2) rows in the image portion 10 are being processed. Under such circumstances, the top row is an odd row and the bottom row is an even row. When the processing of these two (2) rows has been completed, the second (an even) row becomes the top row. The first (an odd) row is replaced by the third (an odd) row and the third row becomes the bottom row in the next processing of two (2) rows. The replacement of the first row by the third row is schematically shown in FIG. 4 by a line 40 extending from the unload control logic 38 to the odd/even outpointer 32 and by lines 42 and 44 respectively extending from the odd/even outpointer to the odd row buffer 34 and the even row buffer 36.

A pair of lines 46 and 48 are respectively shown as extending from the unload control logic 38 to stages 50 and 52 respectively designated as logic detector of video and logic detector of graphics. The stage 50 provides an output when both of the two (2) pixels being processed at any instant have an address indicating that they are video. This address may be in a particular bit in the pixel. This bit may illustratively have a binary "1" indicating video and a binary "0" indicating graphics. In like manner, the stage 52 provides an output when both of the pixels being processed have an address indicating that they are graphics or when one of the pixels has an address indicating graphics and the other pixel has an address indicating video. It is believed that a person of ordinary skill in the art will know how to provide the logic for the stages 50 and 52.

The indications on the lines 42 and 44 are respectively introduced to AND gates 54 and 56. The AND gate 54 also receives the pixel from the odd row buffer 34 and the AND gate 56 also receives the pixel from the even row buffer 36. Depending upon whether the output from the even/odd outpointer 32 points to the odd row buffer 34 or the even row buffer 36, the pixel introduced to the AND gate 54 or the AND gate 56 passes to an OR gate 58. If the pixel is a video pixel, a video detector 60 passes the pixel from the OR gate 58 to an AND gate 62. The AND gate 62 also receives signals through a line 65 from a source 64 of clock signals.

A counter 66 also receives the clock signals from the source 64 and counts these clock signals between "1", and "4" on a resetting or recycling basis. Four output lines 68, 70, 72 and 74 extend from the counter 66 to respectively indicate the decimal counts "1", "2", "3" and "4". The lines 68, 70, 72 and 74 are respectively connected to the AND gate 62 and to AND gates 76, 78 and 80. Each of the AND gates 76, 78 and 80 also receives the clock signals from the source 64 through the line 65 and from the stage 50.

The output of the OR gate 58 is also introduced through an invertor 88 to a graphics detector 90 which provides an output when the top one of the two (2) pixels in the columns being processed is a graphics pixel. The output of the graphics detector 90 is introduced to an AND gate 92 which also receives the clock signals from the source 64 through the line 65 and the signals on the line 68 from the counter 66. The signals on the lines 76, 78 and 80 are respectively introduced to AND gates 94, 96 and 98 as are the clock signals from the source 64 through the line 65 and the output from the stage 52.

As previously indicated, the video detector 60 provides an output when the top one of the two (2) pixels being processed at any instant is a video pixel. This pixel passes through the AND gate 62 when the count in the counter 66 has a decimal value of "1". When the logic detector 50 provides a signal indicating that the two (2) pixels being processed are both video pixels, video pixels respectively pass through the AND gates 76, 78 and 80 at decimal counts of "2", "3" and "4" in the counter 66. Under such circumstances, the output of video pixels from the AND gates 62, 76, 78 and 80 respectively corresponds to outputs 100, 102, 104 and 106 in the image portion 14 of FIG. 1.

The graphics detector 90 provides an output when the top one of the two (2) pixels being processed at any instant is a graphics pixel. This pixel passes through the AND gate 92 when there is a decimal count of "1" in the counter 66. When the logic detector 52 of graphics produces a signal, pixels pass through the AND gates 94, 96 and 98 when there are respectively decimal counts of "2", "3" and "4" in the counter 66. Under such circumstances, the outputs of the graphics pixels from the AND gates 92, 94, 96 and 98 correspond to outputs 108, 110, 112 and 114 in the image portion 14 of FIG. 1.

It may sometimes happen that the top one of the two pixels being processed at any instant is a video pixel and that the bottom one of the two pixels being processed at that instant is a graphics pixel. Under such circumstances, the AND gate 62 passes a video pixel at a decimal count of "1" and the AND gates 94, 96 and 98 pass graphics pixels at decimal counts of "2", "3" and "4". This corresponds to the production of the pixels 116, 118, 120 and 122 in the image portion 12 of FIG. 1.

It may also sometimes happen that the top one of the two (2) pixels being processed at any instant is a graphics pixel and that the bottom one of the two (2) pixels being processed at that instant is a video pixel. Under such circumstances, the AND gates 92, 94, 96 and 98 respectively produce outputs at decimal counts of "1", "2", "3" and "4" to represent graphics pixels. This will respectively correspond to outputs 124, 126, 128 and 130 in the image portion 12 of FIG. 1.

FIG. 5 is similar to FIG. 4 except that it provides for the processing of successive pairs of pixels in a single row. Because of this, an odd column buffer 140 and an even column buffer 142 are provided in the system of FIG. 5, this system being generally indicated at 144. The odd column buffer 140 and the even column buffer 142 in FIG. 5 respectively correspond to the odd row buffer 34 and the even row buffer 36 in FIG. 4. The remainder 148 of the circuitry shown in FIG. 5 may correspond to the remainder of the circuitry shown in FIG. 4. It will be understood that the system 144 in FIG. 5 operates to interpolate at each instant between successive pixels in a single row rather than to interpolate between pixels in a single column as in the embodiment shown in FIG. 4.

FIG. 6 is a table schematically showing how video and graphics pixels are interpolated in accordance with the general discussions above and in accordance with the operation of the circuitry shown in FIGS. 4 and 5. As with the above discussion, a "0" indicates a graphics pixel and a "1" indicates a video pixel. As shown in FIG. 6, a first column indicates the value of a pixel (x,y), the second column indicates the value of a pixel (x,y+1), the third column indicates the value of a pixel x+1, y and the fourth column indicates the value of a pixel (x+1,y+1). The fifth column in FIG. 6 indicates whether an interpolated pixel (x'y') is video or graphics.

As will be seen from FIG. 6, the interpolated pixel (x',y') is a graphics pixel when any one of the four (4) adjacent pixels (x,y), (x,y+1), (x+1,y) and (x+1,y+1) vertically and horizontally is a graphics pixel. This may be seen from the "0" indications in the first four (4) rows for the last column of FIG. 6. The interpolated pixel (x',y') is a video pixel only when the four adjacent pixels (x,y), (x,y+1), (x+1,y) and (x+1,y+1) are video. This is indicated by a "1" in the first four (4) columns of the fifth row in FIG. 6 and by a resultant "1" indication in the fifth column of the fifth row in that Figure.

Figure 7:
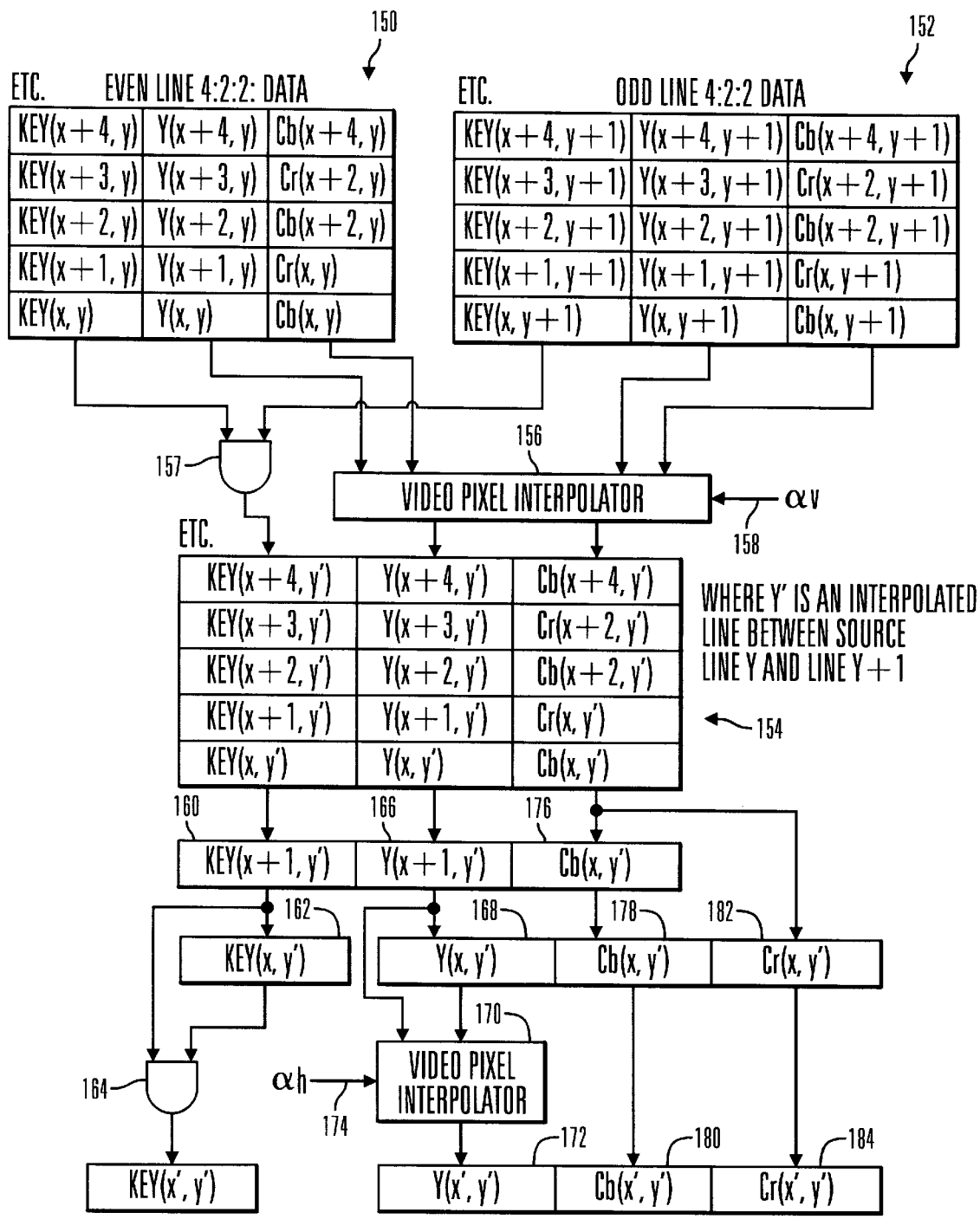
FIG. 7 is a representative logic diagram showing how compressed video data is interpolated or expanded initially in the vertical direction and then in the horizontal direction.

FIG. 7 indicates how video data selected in accordance with the diagrams shown in the FIGS. 1–3 are upscaled or expanded. The video data may be in a compressed format where Y indicates the hue or intensity of a pixel and Cr and Cb indicate the two substantially perpendicular color or chrominance components. The YCrCb format may be compressed in what is commonly designated as a 4:2:2 format. In this format, the value of Y is provided for each pixel, the value of Cb is provided for first alternate pixels and the value of Cr is provided for the other alternate pixels.

In FIG. 7, the 4:2:2 format for even lines of video pixels is generally indicated at 150 in a first table and the 4:2:2 format for odd lines of video pixels is generally indicated at 152 in a second table. Each table includes a first column which designates successive keys indicating the order in which the indications in the 4:2:2 format in the table are decompressed. In each table the successive keys are disposed progressing upwardly.

In FIG. 7, the tables 150 and 152 respectively indicate progressive bytes of information in the vertical direction for the even and odd lines. For example, the table 150 indicates the luminance byte Y(x,y) at the same time that the table 152 indicates the luminance byte Y(x,y+1). The video pixel interpolator 156 interpolates a value y' for the x pixel such as by averaging the luminance values y and y+1 so as to obtain the luminance value Y(x,y'). The interpolated value Y(x,y') is indicated in a table 154.

At the same time that the interpolator 156 provides the interpolated luminance value Y(x,y'), the interpolator also averages the chrominance value Cb(x,y) in the table 150 for the even line and the chrominance value Cb(x,y+1) in the table 152 for the odd line. As indicated in table 154, an interpolated chrominance value Cr(x,y') is accordingly produced.

In like manner as indicated in the table 154, the interpolator 156 interpolates in the x direction between the luminance values Y(y+1) in the lines y and y+1. At the same time that the luminance values are being interpolated, an interpolation is provided on an alternate basis between one of the Cr and Cb values for the x position in the y and y+1 lines. This interpolation is provided alternately in odd positions of x for the Cr component of chrominance and in even positions of x for the Cb component of chrominance.

The interpolations of luminance between the corresponding values in the y and y+1 lines as discussed above are provided under the control of an AND network 157. The AND network 157 passes corresponding keys from the tables 150 and 152 and produces an interpolated key in the table 154. For example, the AND network 157 receives the key (x,y) from the table 150 and the key (x,y+1) from the table 152 and produces the key (x,y') in the table 154.

As previously discussed, the sequence interpolated to provide the additional line y' between the lines y and y+1 for each of the successive horizontal pixels x, x+1, x+2, etc. is indicated in the table 154. In providing the interpolation in the successive values of x for the y' column, the interpolator 156 weights the individual values in the pair being interpolated. This weighting is provided in accordance with the weighing factor α, which is introduced to the interpolator 156 on a line 158.

The sequence 154 is now interpolated in the horizontal direction to provide interpolated values between successive pairs of x values in the y' line. For example, the pixels x and x+1 in the y' line are interpolated to provide an additional pixel between the pixels, x and x+1 in the y' line. This corresponds to a pixel x',y'. Similarly, the pixels x+1 and x+2 are interpolated to provide an additional pixel x',y' between the pixels x+1,y' and x+2,y'. As will be seen, the interpolated pixels between the successive pairs of pixels in the line y' are indicated generally at x' although the value of each of these interpolated x' pixels may be different from the other interpolated x' pixels. For example, the value of the interpolated pixel (x,y') between the pixels (x,y') and x+1,y') may be different from the value (x') of the interpolated pixel (x',y') between the pixels (x+1,y') and x+2,y').

To obtain the x' pixels, the successive keys in the sequence 154 for the interpolated y' line are introduced in sequence to a stage 160. The key in the stage 160 is then introduced to the stage 162 at the same time that the next key in the table 156 is introduced to the stage 160. In this way, the key (x,y') occurs in the stage 160 at the same time that the key (x+1,y') occurs in the stage 162. The keys in the stages 160 and 162 are introduced to an AND network 164 to obtain the key (x',y').

In like manner, the successive values of the luminance Y are introduced in sequence to a stage 166. The value of the luminance Y in the stage 166 is then introduced to a stage 168 at the same time that the next value of the luminance Y in the table 156 is introduced to the stage 166. In a first interpolation, the Y value (x,y') in the line y' appears in the stage 166 at the same time that the next Y value (x+1,y') in the line y' appears in the stage 168. These values are introduced to a video pixel interpolator 170 to obtain the interpolated value Y(x',y') in a stage 172. An input is introduced to the interpolator 170 through a line 174 to weight the value Y(x,y') in the stage 168 and the value Y(x+1,y') in the stage 166 in obtaining the interpolation value Y(x',y')in the stage 170.

The Cr and Cb interpolated values for the interpolated position x' in the interpolated line y' are provided without change from the x position which is immediately previous to the x' position. The Cb (x,y') value is delayed by one clock cycle by passing from the stage 176 to the stage 178. In this way, the Cb(x,y') chrominance value in the stage 178 corresponds in time in the stage 178 to the Y(x',y') interpolated luminance value passing through the video pixel interpolator 170. In this way, the chrominance value Cb(x,y') constitutes the interpolated value Cb(x',y') as indicated at 180.

The Cr(x,y') chrominance value is introduced to a stage 182 one cycle later in time than the Cb(x,y') chrominance value is introduced to the stage 176. As a result, the Cr(x,y') value in the stage 182 corresponds in time to the Cb(x,y') value in the stage 178. The chrominance value Cr(x,y') constitutes the interpolated value Cr(x',y') as indicated at 184 in FIG. 7.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

What is claimed is:

1. In combination for providing an interpolation in two (2) coordinate directions between an image formulated partially from graphic pixels and partially from video pixels:

first means for providing a plurality of pixels in each of the two (2) coordinate directions where some of the pixels represent video and some of the pixels represent graphics; and second means for interpolating a plurality of pixels between each adjacent pair of pixels in one of the two (2) coordinate directions to form video pixels between each such adjacent pair of pixels in the two (2) coordinate directions upon the occurrence of video in both pixels of such adjacent pair in (1) of the two (2) coordinate directions and to form a plurality of graphics pixels between such adjacent pair of pixels in the one of the two coordinate directions upon the occurrence of graphics in at least one (1) of the pixels in such adjacent pair in one (1) of the two (2) coordinate directions.

2. In a combination as set forth in claim 1, third means for interpolating each adjacent pair of pixels in the other of the two (2) co-ordinate directions to interpolate video pixels between each such adjacent pair of pixels in the other of the two coordinate directions upon the occurrence of video in such adjacent pair of pixels in the other of the two (2) co-ordinate directions and to interpolate graphics pixels between such adjacent pair of pixels in the other of the two coordinate directions upon the occurrence of graphics in at least one of the pixels in such adjacent pair of pixels in the other of the two (2) coordinate directions.

3. In a combination as set forth in claim 1 wherein the two coordinate directions are horizontal and vertical and wherein the second means provides a particular number of interpolated pixels between the adjacent pixels in each pair in a particular one of the horizontal and vertical directions.

4. In a combination as set forth in claim 2 wherein the two coordinate directions are horizontal and vertical and wherein the second means provides a first particular number of interpolated pixels between the adjacent pixels in each pair in a particular one of the horizontal and vertical directions and wherein the third means provides a second particular number of interpolated pixels between the adjacent pixels in each pair in the other one of the horizontal and vertical directions.

5. In combination for providing an interpolation in two (2) coordinate directions between an image formulated partially from graphics pixels and partially from video pixels;

first means for providing a plurality of pixels in each of two (2) coordinate directions where some of the pixels represent graphics and other of the pixels represent video; and second means for providing a plurality of interpolated pixels between the pixels in the plurality where each interpolated pixel in a row or column constitutes video when both adjacent pixels, on the opposite sides of such interpolated pixels in such row or column, constitute video pixels and providing a plurality of graphics pixels where at least one of the adjacent pixels, on the opposite sides of such interpolated pixels in such row or column, constitutes a graphics pixel.

6. In a combination as set forth in claim 5 wherein the second means provides the same amount of interpolation between the adjacent pixels in the rows as between the adjacent pixels in the columns.

7. In a combination as set forth in claim 5 wherein the video is in YCrCb format and wherein each of the pixels provided by the first means has individual values of Y, Cr and Cb and wherein third means provide an interpolation in an additional pixel in each row between the values of Y in the adjacent pixels on the opposite sides in such row of such additional pixel and an interpolation in an pixel in each column between the values of Y in the adjacent pixels on the opposite sides in such column of such additional pixel.

8. In a method of interpolating in two (2) coordinate directions between a portion of an image formulated partially from graphics and partially from video, the steps of:

providing a plurality of pixels, some graphics and others video, in two (2) coordinate directions to form the image; and forming video pixels between the adjacent pixels in each individual one of the two (2) coordinate directions when both adjacent pixels are video pixels and otherwise forming a plurality of graphics pixels between the adjacent pixels forming the image in such individual one of the two (2) coordinate directions.

9. In a method as set forth in claim 8, the steps of:

interpolating initially between the adjacent pixels in an individual one of the two (2) coordinate directions to form additional video pixels between adjacent video pixels forming the image in such individual one of the two (2) coordinate directions, and interpolating subsequently between the adjacent pixels in the other one of the two (2) coordinate directions to form additional video pixels between adjacent video pixels forming the image in such other one of the two (2) coordinate directions.

10. In a method as set forth in claim 8, the steps of:

providing the video pixels in the image in YCrCb format wherein each of such video pixels has individual values of Y,Cr and Cb, and interpolating for each additional video pixel in each individual one of the two coordinate directions between the YCrCb values of the adjacent video pixels forming the image on the opposite sides of such interpolated video pixel in such individual one of the two coordinate directions.

11. In a method as set forth in claim 9, the steps of:

providing the video pixels in the image in YCrCb format wherein each of such video pixels has individual values of Y,Cr and Cb, initially interpolating for each interpolated video pixel in the individual one of the two coordinate directions between the YCrCb values of the video pixels forming the image on the opposite sides of such interpolated video pixel in such individual one of the two coordinate directions, and subsequently interpolating for each interpolated video pixel in the other one of the two coordinate directions between the YCrCb values of the video pixels forming the image on the opposite sides of such interpolated video pixel in such other one of the two coordinate directions.

12. A method of interpolating pixel types, in an image formed partly from graphics and partly from video pixels, in both horizontal and vertical directions, the method comprising:

providing a two dimensional image having a plurality of pixels, the plurality of pixels comprising at least one video pixel and at least one graphics pixel;

expanding the image in a first direction by placing a plurality of interpolated pixels in the first direction between two adjacent pixels in the two dimensional image, said adjacent pixels being adjacent in the first direction;

defining the plurality of pixels interpolated in the first direction as video pixels if both adjacent pixels, in the two dimensional image, are video pixels and defining the plurality of pixels interpolated in the first direction as graphics pixels if both adjacent pixels, in the two dimensional image, are not video pixels thereby creating a second image;

expanding the second image in a second direction by placing a plurality of interpolated pixels in the second direction between two adjacent pixels in the two dimensional image, said adjacent pixels being adjacent in the second direction;

defining the plurality of pixels interpolated in the second direction as video pixels if both adjacent pixels, in the two dimensional image, are video pixels and defining the plurality of pixels interpolated in the second direction as a plurality of graphics pixels if both adjacent pixels, in the two dimensional image, are not video pixels thereby creating an image expanded and interpolated in both horizontal and vertical directions.

13. A method as in claim 12 wherein the first direction is the horizontal direction and the second direction is the vertical direction.

14. A method as in claim 12 wherein the first direction is the vertical direction and the second direction is the horizontal direction.

* * * * *